US006532239B1

United States Patent
Shim et al.

(10) Patent No.: US 6,532,239 B1
(45) Date of Patent: Mar. 11, 2003

(54) TRANSMISSION/RECEPTION CONCURRENT MATCHING APPARATUS FOR TDM CHANNELS AND METHOD THEREOF

(75) Inventors: Heon Yong Shim, Kyoungki-do (KR); Sung Sam Lee, Kyoungki-do (KR); June Man Kim, Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/206,327

(22) Filed: Dec. 8, 1998

(30) Foreign Application Priority Data

Dec. 27, 1997 (KR) ............................................. 97-75568
Dec. 27, 1997 (KR) ............................................. 97-75569

(51) Int. Cl.[7] .............................................. H04L 12/54
(52) U.S. Cl. ...................... 370/429; 370/438; 370/442; 370/458
(58) Field of Search ................................. 370/230, 282, 370/363, 438, 442, 458, 381, 535, 412, 427, 429

(56) References Cited

U.S. PATENT DOCUMENTS

| 5,056,084 | A | * | 10/1991 | Le Corre ....................... 370/99 |
| 5,144,623 | A | * | 9/1992 | Bernardini .................. 370/94.1 |
| 5,218,680 | A | * | 6/1993 | Farrell et al. ................ 395/325 |
| 5,630,065 | A | | 5/1997 | Ishii |
| 5,721,726 | A | * | 2/1998 | Kurnick et al. ............. 370/236 |
| 5,856,999 | A | * | 1/1999 | Robinson et al. ........... 375/221 |

* cited by examiner

Primary Examiner—Hassan Kizou
Assistant Examiner—Anh-Vu H Ly
(74) Attorney, Agent, or Firm—J. Harold Nissen; Myron Greenspan; Lackenbach & Siegel, LLP

(57) ABSTRACT

A transmission/reception concurrent matching apparatus for a multiple of TDM channels and a method thereof, wherein in matching the TDM channels, upon data transmission, a signal Serial Communication Controller(SCC) stores data to transmit per each data channel into a multiple of First-in First-out buffers(FIFOs) and transmits in order the data from each FIFO by one byte through a TDM bus, and upon data reception, stores the received data through the TDM bus into each FIFO and processes the data from each FIFO by reading out the data in order. As the number of SCC is reduced, the cost to process the data is saved.

11 Claims, 7 Drawing Sheets

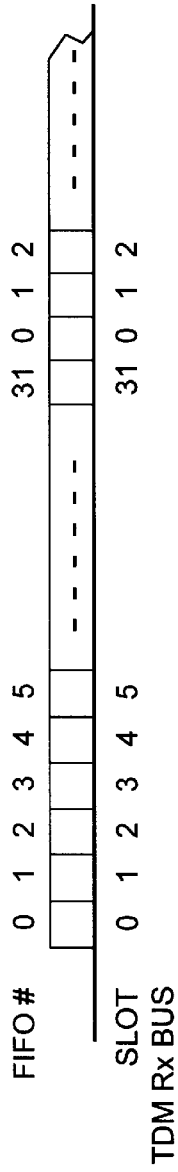
F I G. 6
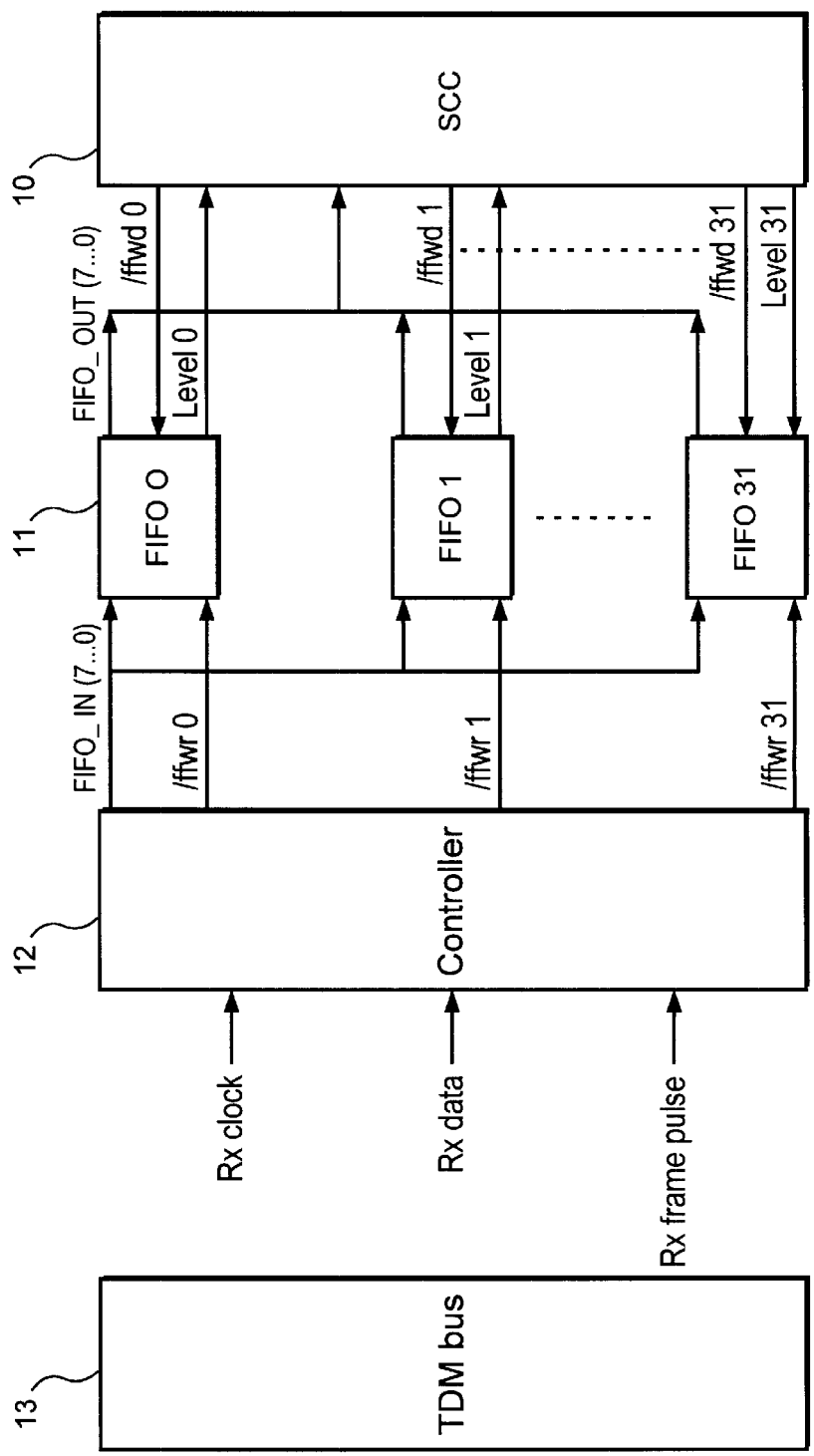
F I G. 7

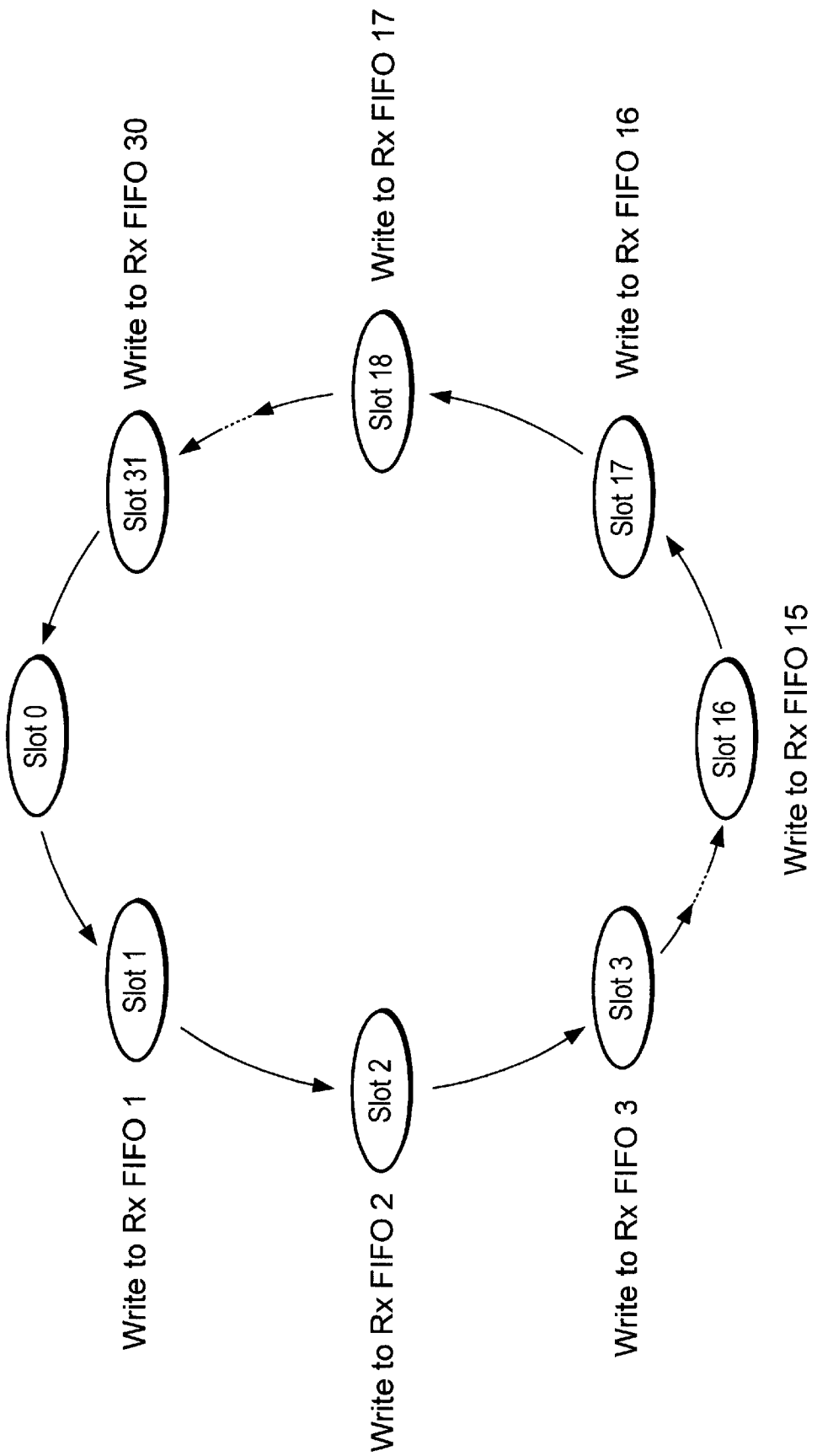
F I G. 8

TRANSMISSION/RECEPTION CONCURRENT MATCHING APPARATUS FOR TDM CHANNELS AND METHOD THEREOF

FIELD OF THE INVENTION

This invention relates to a Time Division Multiplexing (TDM) system, and more particularly, to a transmission/reception concurrent match apparatus for a multiple of TDM channels and a method thereof, wherein, in matching the TDM channels, upon data transmit, a single serial Communication Controller(SCC) stores data to transmit per each data channel into a multiple of First-in First-out buffers (FIFOs) and transmits in order the data from each FIFO by one byte through a TDM bus, and upon data reception, stores the received data through the TDM bus into each FIFO and processes the data from each FIFO by reading out the data in order.

BACKGROUND OF THE INVENTION

Conventionally, there is serial communication between other boards or systems such as communication between a main processor and a peripheral processor in a control system of a Full Electronic Exchange, in which various protocols are used in the serial communication. One of the protocols is a High Level Data Link Control(HDLC). As illustrated in FIG. 1, a data frame to be exchanged between two systems by the HDLC is consisted of flags, a significant data and a cyclic redundancy code(CRC). The flag shows start and end of the frame and the CRC shows a part that the SCC additionally insert to the frame to test whether frame error has occurred or not. Generally, the CRC utilizes 16 bit or 32 bit. When idle having no significant data, the CRC sequentially transmits logic 1, and if a CPU transfers desired significant data to the SCC, the SCC constructs the data frame and transmits the same other processor. Also, upon data receiving, the SCC finds a flag pattern from a bit stream, senses the start and end of the flag and only transfers the significant data to the CPU.

The TDM bus is a multiple connection bus divided into 32 time slots, in which each time slot correspond to one channel, and the serial communication is executed using the time slots.

In the prior art, to realize the serial communication of multiple channel by the HDLC protocol, it is necessary to connect a multiple of SCC corresponding to each channel, because each time slot has various states of idle, significant and flag.

Therefore, upon matching the TDM channels with the SCCs, respective SCC channel have to be needed per each channel. Accordingly, the SCC must have equal number to the number of the channel for matching each other.

U.S. Pat. No. 5,630,065 discloses a time-division multiplex communication system that matches a plurality of data links and multiplexes them. The system is characterized in that a concentrator processes input signals from the respective data link without affecting the data links and a distributor sends the signals though a common data link from the concentrator to respective individual links according to address information from the address indication channel.

Also, the concentrator has a concentration control function to interconnect the individual links and multiplexes signal over the common data link channel through a an input port switching device and a concentration control device, and the distributor has a distribution control function for distributing link control signals, multiplexed over the common data channel to the individual links based on the address information from the address identification channel through an individual link connecting devices and a distribution control device. As the patent, however, has complex constitution or matching a multiple of links, this system is also noneffective as the above prior art.

SUMMARY OF THE INVENTION

It is therefore one object of the present invention to provide, in data transmitting between each system, a transmission concurrent matching apparatus and method for a multiple of TDM channels, in which a signal SCC stores data to transmit per each data channel into a multiple of FIFOs and transmits in order the data from each FIFO by one byte through a TDM bus.

It is therefore other object of the present invention to provide, in data transmitting between each system, a reception concurrent matching apparatus and method for a multiple of TDM channels, in which a signal SCC stores the received data through the TDM bus into each FIFO and processes the data from each FIFO by reading out the data in order.

In accordance with one aspect of the invention, there is provided a transmission concurrent matching apparatus for a multiple of TDM channel for matching data to the transmitted through the channels by the HDLC between respective system such as a main processor and a peripheral processor of a Full Electronic Exchange characterized by: a SCC for producing a plurality of write signals to process sequentially data to transmit per each data channel; a plurality of FIFOs for receiving the write signals form the SCC, storing and outputting the signals according to inputted order thereto; and a control means for reading out in order the data from each FIFO by one byte and outputting a clock, data and a frame synchronous pulse for transmitting into a TDM bus having a multiple of time slots.

In accordance with another aspect of the invention, there is provided a transmission concurrent matching method for a multiple of TDM channels for matching data to be transmitted through the channels by the HDLC between respective system such as a main processor and a peripheral processor of a Full Electronic Exchange characterized by: the steps of: producing a plurality of write signals to process sequentially data to transmit per each data channel; receiving the write signals, storing and outputting the signals according to received order; and reading out in order the data by one byte and outputting a clock, data and a frame synchronous pulse for transmitting into a TDM bus having a multiple of time slots.

In accordance with further aspect of the invention, there is provided a reception concurrent matching apparatus for a multiple of TDM channels for matching data to be received through the channels by the HDLC between respective system such as a main processor and a peripheral processor of a Full Electronic Exchange characterized by: a control means for receiving a clock, data and a frame synchronous pulse from outside system through a TDM bus having a multiple of time slots, and producing a multiple of write signals for data of each time slot; a plurality of FIFOs for storing and outputting according to inputted order thereto the data to be received based on the write signals from the control means; and a SCC for reading out and processing the data from the FIFOs per each time slot.

In accordance still other aspect of the invention, there is provided a reception concurrent matching method for a multiple of TDM channels for matching data to be received through the channels by the HDLC between respective system such as a main processor and a peripheral processor of a Full Electronic Exchange characterized by the steps of: received a clock, data and a frame synchronous pulse from outside system through a TDM bus having a multiple of time slots, and producing a multiple of write signals for data of each time slot; storing and outputting in order the data based on the write signals; and reading out the data per each time slot and processing the data when the data reaches a predetermined level.

BRIEF DESCRIPTION OF THE DRAWINGS

The invention disclosed herein will be understood better with reference to the following drawing of which:

FIG. 6 is showing correspondence relationship between each time slot of a TDM bus and each reception FIFO;

FIG. 7 is a block digram for realizing a reception concurrent matching apparatus for a multiple of TDM channels;

FIG. 8 is a flow chart showing that a controller of FIG. 7 writes each time slot into each reception FIFO.

DETAILED DESCRIPTION OF THE PREFERRED EMBODIMENTS

Hereinbelow, detailed embodiments of the present invention will be described in detail with reference to accompanying drawings.

Figures 1, 2:
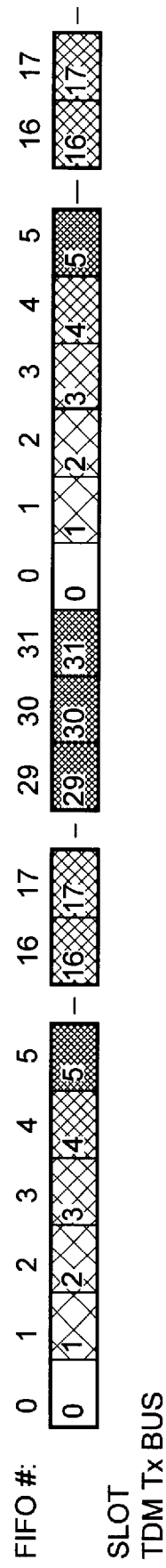
FIG. 1 is an architecture of a data frame adapted to the present invention.
FIG. 2 is showing correspondence relationship between each time slot of a TDM bus and each transmission FIFO.

FIG. 2 is showing correspondence relationship between each time slot of the TDM bus and each transmission FIFO, wherein data load on time slots 0–31 of the TDM bus by one byte to correspond to each transmission FIFO. As shown in the drawing, the TDM bus is consisted of 32 time slots 0–31, which form one TDM Frame. Also the number of the FIFO is consisted of 32 to correspond to the time slot. The start and the end of the TDM frame are identified as a frame synchronous pulse for frame synchronizing.

Figure 3:
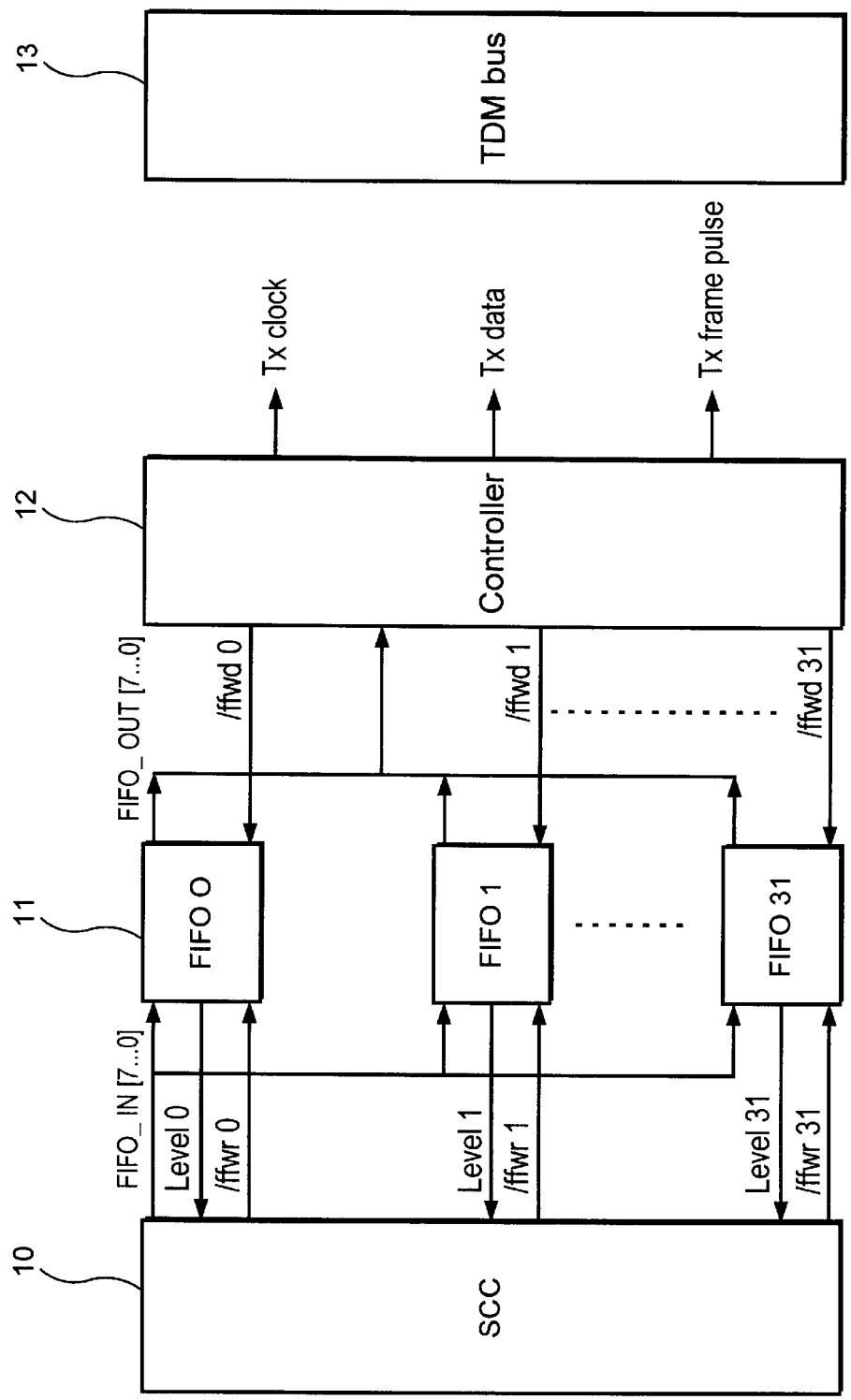
FIG. 3 is a block diagram for realizing a transmission concurrent matching apparatus for a multiple of TDM channels.

Referring to FIG. 3, there is shown a block diagram for realizing a transmission concurrent matching apparatus for a multiple of TDM channels. As illustrated in FIG. 3, the apparatus comprises a SCC 10 for producing a plurality of write signals to sequentially process data to transmit per each data channel; 32 transmission FIFOs 11 for receiving the write signals form SCC10, storing and outputting the signals according to inputted order thereto; and a controller 12 for reading out in order the data from each FIFO 11 by one byte and outputting a clock, data and a frame synchronous pulse into a TDM bus 13 having a multiple of time slots.

The SCC 10 checks in order each transmission FIFO 11, produces data to transmit from the channel having smallest data among the channels corresponding to each FIFO 11 and stores the data to associated FIFO 11. Also, the SCC 10 repeats the step in order. The controller 12 sequentially reads the data from each FIFO 11 per one byte and loads the data on the TDM bus 13.

With reference to FIG. 3, operation of the transmission concurrent matching apparatus for a multiple of TDM channels according to the present invention will now be described below.

The SCC 10 produces write signals /ffwr0–ffwr31 to sequentially process data to trasmit per each data channel and send the signals to the FIFO0–FIFO31 through a data bus FIFO-IN[7 . . . 0] of 8 bits. Then each FIFO 11 stores in order write signals form the SCC 11 to respond to the channels of the TDM bus 13 and output the signals according to inputted order thereto the controller 12 through a data bus FIFO-OUT[7 . . . 0] of 8 bits. The controller 12 produces read signals /ffrd 0–ffrd 31 to read the data from is each FIFO 0–FIFO 31, reads the data by one byte based on the read signals and outputs the clock, the data and the frame synchronous pulse through the TDM bus 13 to other system (not shown). In data storing of the FIFO 0–FIFO 31, level signal producers(not shown) of the FIFO 0–FIFO 31 produce level signals level 10-level 31 information that the FIFO 0–FIFO 31 have stored data above predetermined level and transfer the same to the SCC 12. Receiving the level signals, the SCC 12 checks in order each FIFO 11 based on the level signals, produce data to transmit from the channel having smallest data among the channels corresponding to each FIFO 11 and stores the data to associated FIFO 11.

Figure 4:
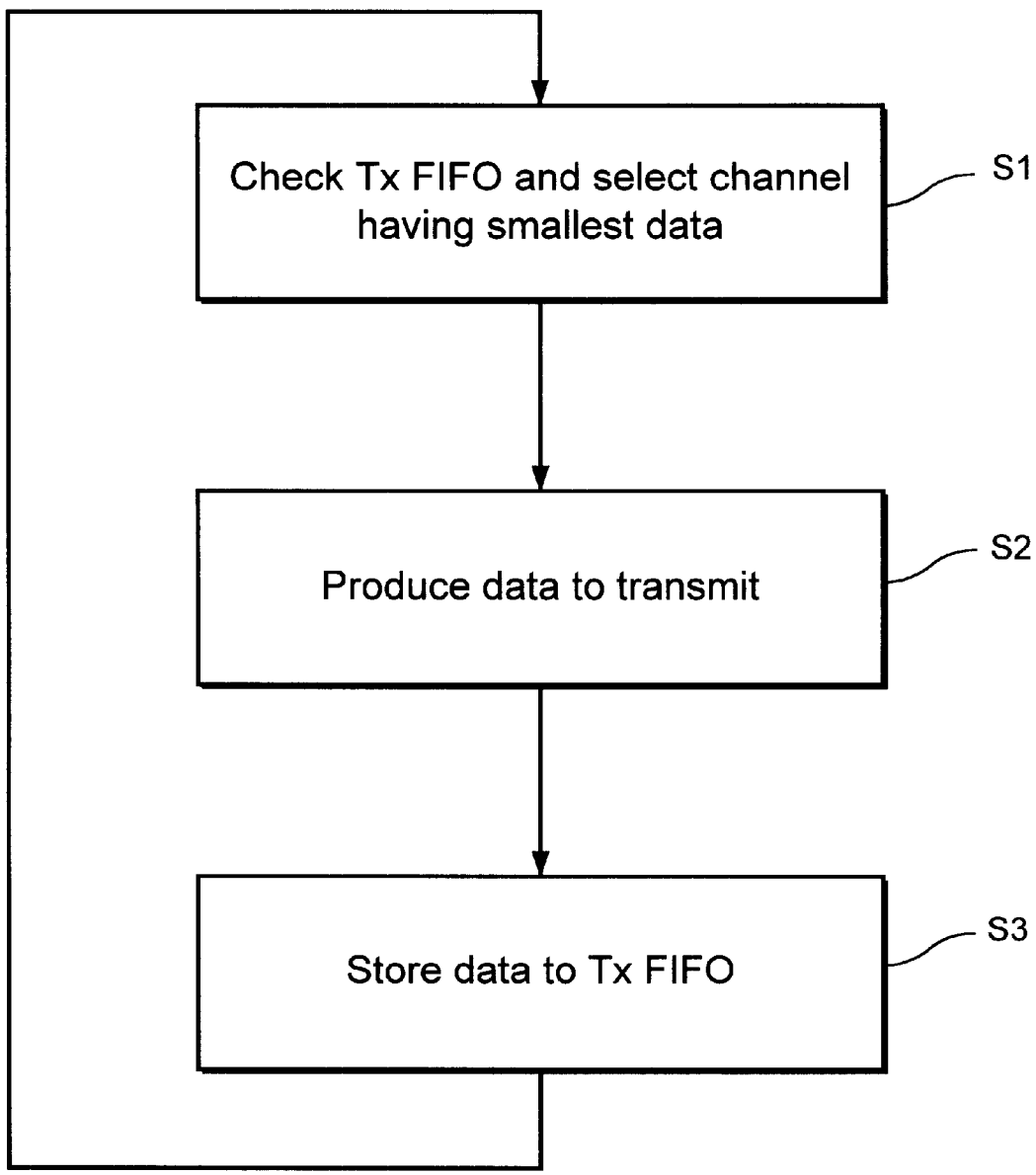
FIG. 4 is a flow chat showing order that a SCC of FIG. 3 stores data to transmit to each FIFO.

FIG. 4 shows a flow chart that the SCC 10 sequentially stores the data to transmit to each FIFO 11. The SCC 10 checks respective FIFO 0–FIFO 31 and selects the channels corresponding to the FIFO 0–FIFO 31 and having smallest data in step 1, produces the data to transmit in step 2 and stores the data to each FIFO 11 in step 3. The SCC 10 repeatedly executes the steps.

Figure 5:
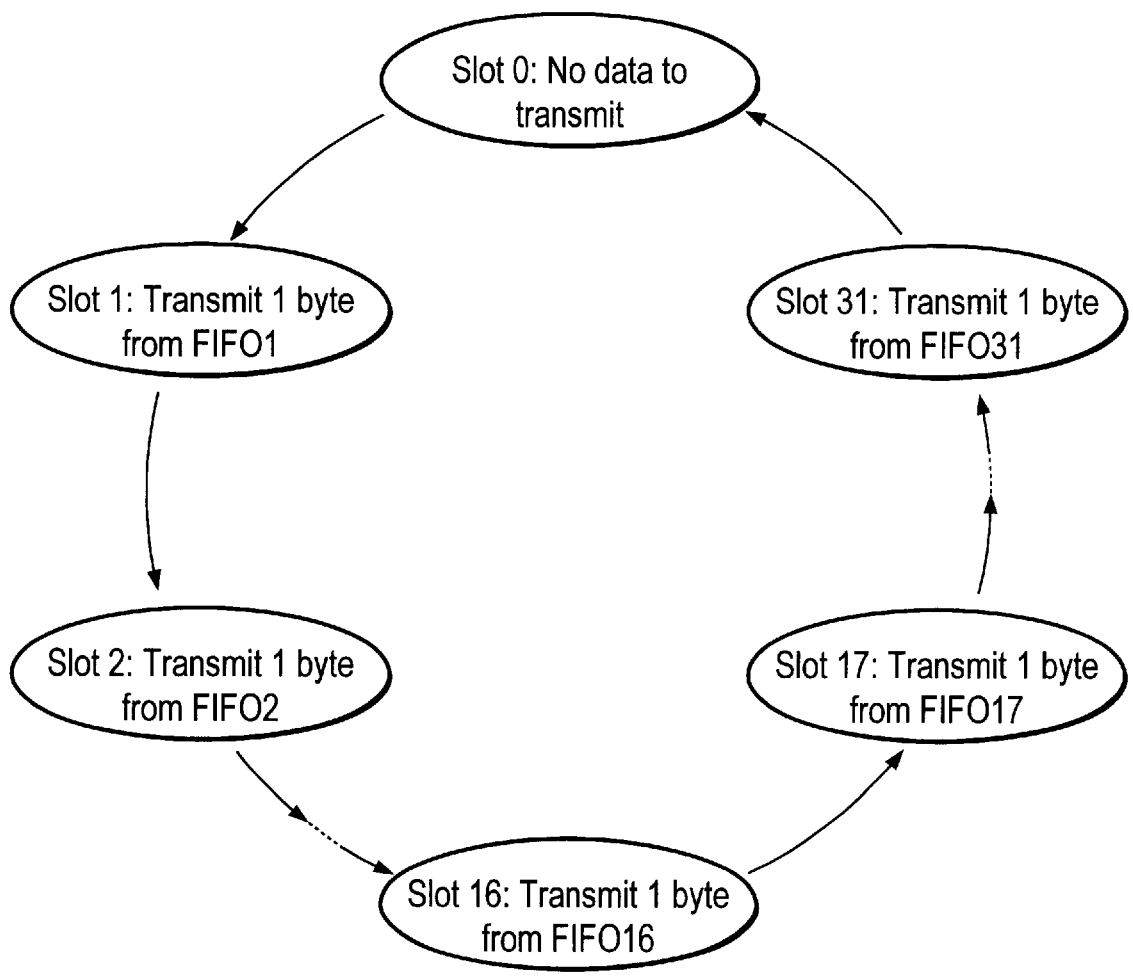
FIG. 5 is a flow chart showing that a controller of FIG. 4 reads and transmits data in order by one byte from each transmission FIFO.

FIG. 5 shows a flow chart that the SCC 10 sequentially reads the data by one byte from each FIFO 11 and transfer the data through the TDM bus 13. The SCC 10 repeatedly executes the process. At this time, the SCC 10 executes parallel-to-serial transform of the data that is 8 bit parallel data before transferring the data.

FIG. 6 is showing correspondence relationship between each time slot of the TDM bus and each reception FIFO. As the constitution of FIFO.6 is similar to FIG. 2, detailed description will be omitted.

Referring to FIG. 7, there is shown a block diagram for realizing a reception concurrent matching apparatus for a multiple of TDM channels. With regard to FIG. 3, like numerals designate like or corresponding parts.

As illustrated in the drawing, the apparatus of the present invention comprises the controller 12 for receiving a clock, data and a frame synchronous pulse of respectively 8 bits from outside system through the TDM bus 13 having 32 of time slots, and producing a multiple of write signals for data of each time slot, a plurality of FIFOs 11 for storing and outputting according to inputted order thereto the data to be received based on the write signals from the controller 12, and the SCC 10 for reading out and processing the data from the FIFOs 11 per each time slot.

The SCC 10 checks in order each FIFO 0–FIFO 31 and sequentially processes for the FIFOs having data by the HDCL protocol.

With reference to FIG. 7, operation of the reception concurrent matching apparatus for a multiple of TDM channels according to the present invention will be described below.

Upon receiving the clock, the data and the frame synchronous pulse of respectively 8 bits from outside system through the TDM bus 13, the controller 12 produces the write signals /ffwr 0–ffwr 31 and transfer the same to 32 the FIFOs 11 through the data bus FIFO-IN[7 . . . 0] of 8 bits. Then each FIFO 0–FIFO 31 stores respective write signal from the controller 12 to respond to the channels of the TDM bus 13 and outputting the signals according to inputted order thereto the controller 12 through the data bus FIFO-OUT [7 . . . 0] of 8 bits. The SCC 10 produces read signals/ffrd 0-ffrd 31 to read the data from each FIFO 11, reads and process the data by one byte based on the read signals. In data storing of the FIFO 0–FIFO 31, level signal producers (not shown) of FIFO 0–FIFO 31 produce level signals level 0–level 31 informing that the FIFO 0–FIFO 31 have stored data above predetermined level and transfer the same to the SCC 10. The SCC 10 checks in order each FIFO 11 based on the level signals and processes for the FIFO 11 having data above predetermined level.

Referring to FIG. 8, there is shown a flow chart showing that the controller 12 of FIG. 7 writes each time slot into each reception FIFO 11 from the time slot 0 to time slot 31. At the occurrence of optional error such as a write error, writing starts from the time slot 0 by the frame synchronous signal regardless of write flow.

Figure 9:
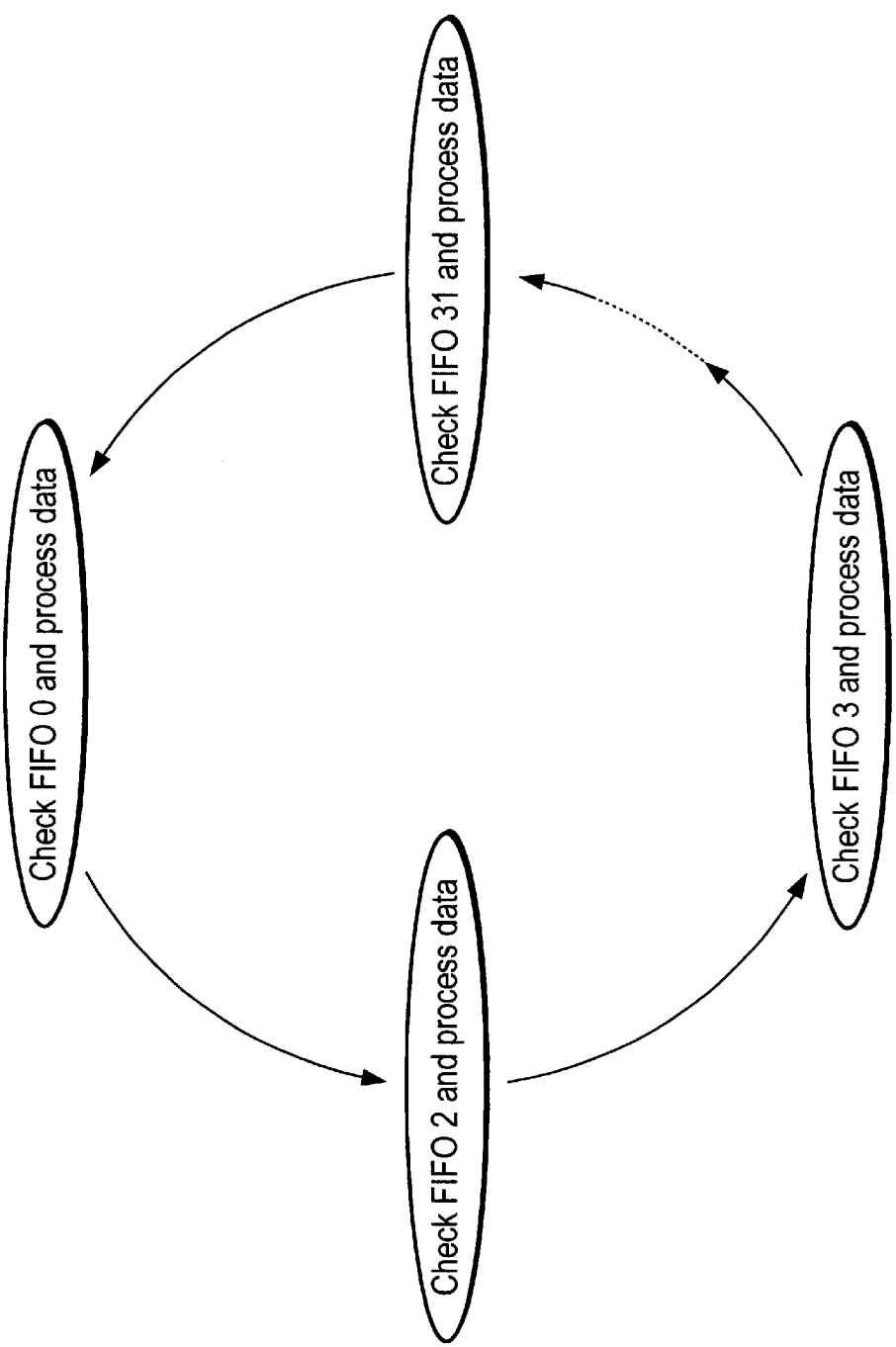
FIG. 9 is a flow chart showing that a SCC of FIG. 7 test each reception FIFO and process data thereof.

FIG. 9 is a flow chart showing that the SCC of FIG. 7 tests each reception FIFO and processes data thereof. The SCC 10 checks in order each FIFO 11 and processes for only the FIFO 11 having data above predetermined level.

As explained hereinabove, according to the present invention, when matching the TDM channels, upon data transmission, the SCC stores data to transmit per each data channel into FIFOs and transmits in order the data from each FIFO by one byte through the TDM bus, and upon data reception, stores the received data through the TDM bus into each FIFO and processes the data from each FIFO by reading out the data in order, thereby saving the costs to process the data.

While a certain preferred embodiment of the present invention has been shown and described in detail, such description is for illustrative only and it is to be understood that various change and variations may be made without departing from the spirit or scope of the following claims.

What is claimed is:

1. A transmission concurrent matching apparatus for a multiple of TDM channels for matching data to be transmitted through the channels by the HDLC between a main processor and a peripheral processor of a Full Electronic Exchange comprising: a single Special Communications Control, designated SCC for producing a plurality of write signals to process sequentially data to transmit per each data channel; a plurality of FIFOs for receiving the write signals from the SCC, storing and outputting the signals according to inputted order thereto; and a controller for reading out in order the data from each FIFO by one byte and outputting a clock, data and a frame synchronous pulse for transmitting through a TDM Bus having a multiple of time slots, the SCC checks in order for each transmission from FIFO and produces data to transmit from the channel having the smaller data among the channels corresponding to each FIFO and stores the data into associated FIFO.

2. A transmission concurrent matching apparatus for a multiple of TDM channels as claimed in claim 1, in which a data bus of 8 bits is used to transfer the data between the SCC and each FIFO and another data bus of 8 bits is used to transfer the data between the each FIFO and the controller.

3. A transmission concurrent matching apparatus for a multiple of TDM channels as claimed in claim 1, in which the SCC selects the channel having smallest data among respective FIFO allocated per each channel thereof, produces data to transmit and stores the data to associated FIFO corresponding to the channel.

4. A transmission concurrent matching method for a multiple of TDM channels for matching data to be transmitted through the channels by the HDLC between a main processor and a peripheral processor of a Full Electronic Exchange comprising the steps of: producing a plurality of write signals to process sequentially data to transmit per each data channel; receiving the write signals, storing and outputting the write signals according to a received order; and reading out in order the data by one byte and outputting a clock synchronous pulse, a data synchronous pulse and a frame synchronous pulse for transmitting into a TDM bus having a multiple of time slots, and checking by the SCC in order each transmission from FIFO and producing data to transmit from the channels having the smaller data among the channels corresponding to each FIFO and storing the data into its associated FIFO.

5. A transmission concurrent matching method for a multiple of TDM channels as claimed in claim 4, in which the write signal producing step comprises the step of generating level signals informing of data storage above a predetermined level.

6. A reception concurrent matching apparatus for a multiple of TDM channels for matching data to be received through the channels by the HDLC between respective system such as a main processor and a peripheral processor of a Full Electronic Exchange comprising: a control means for receiving a clock, data signal and a frame synchronous pulse from outside system through a TDM bus having a multiple of time slots, and producing a multiple of write signals for data of each time; a plurality of FIFOs for storing and outputting by one byte through the TDM bus according to inputted order thereto the data to be received based on the write signals from the control means; and a single SCC (Serial Communication Controller) for reading out and processing the data from the FIFOs per each time slot.

7. The apparatus for a multiple of TDM channels as claimed in claim 6, in which a data bus of 8 bits is used to transfer the data between the SCC and each FIFO and other data bus of 8 bits is used to transfer the data between the each FIFO and the control means.

8. The apparatus for a multiple of TDM channels as claimed in claim 6, in which each FIFO generates a level signal informing of data storage above a predetermined level.

9. A reception concurrent matching method for a multiple of TDM channels for matching data to be received through the channels by the HDLC between respective system such as a main processor and a peripheral processor of a Full Electronic Exchange including the steps of: receiving a clock, data and a frame synchronous pulse from an outside system through a TDM bus having a multiple of time slots, and producing a multiple of write signals for data of each time slot; a plurality of FIFOs for storing and outputting the data in order received based on the write signals received; and reading out the data per each time slot and processing the data when the data reaches a predetermined level.

10. A reception concurrent matching method for a multiple of TDM channels as claimed in claim 9, in which the write signal producing step comprises the step of shifting to time slot 0 by a frame synchronous signal upon occurrence of data error.

11. The apparatus as claimed in claim 1, wherein the SCC stores the received data received through the TDM bus into each FIFO by reading the data from each FIFO in order.

* * * * *